US007664596B2

(12) United States Patent
Wise et al.

(10) Patent No.: US 7,664,596 B2

(45) Date of Patent: Feb. 16, 2010

(54) AIR TRAFFIC DEMAND PREDICTION

(75) Inventors: Gerald Bowden Wise, Clifton Park, NY (US); John Michael Lizzi, Wilton, NY (US); Louis John Hoebel, Burnt Hills, NY (US); Rajesh Venkat Subbu, Clifton Park, NY (US); Daniel Joseph Cleary, Schenectady, NY (US); Liviu Nedelescu, Arlington, VA (US); Paul W. Mettus, Gaithersburg, MD (US); Bradley A. Culbertson, Gaithersburg, MD (US); Jonathan Dehn, Damascus, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 617 days.

(21) Appl. No.: 11/427,728

(22) Filed: Jun. 29, 2006

(65) Prior Publication Data

US 2008/0004792 A1 Jan. 3, 2008

(51) Int. Cl.
*G06F 17/00* (2006.01)
*G06F 19/00* (2006.01)

(52) U.S. Cl. ...................................... 701/120; 701/202

(58) Field of Classification Search ....................... None
See application file for complete search history.

(56) References Cited

U.S. PATENT DOCUMENTS

| | | | | |
|---|---|---|---|---|
| 6,393,358 | B1 * | 5/2002 | Erzberger et al. | 701/120 |
| 6,463,383 | B1 * | 10/2002 | Baiada et al. | 701/120 |
| 6,789,011 | B2 * | 9/2004 | Baiada et al. | 701/120 |
| 2004/0193362 | A1 * | 9/2004 | Baiada et al. | 701/120 |
| 2006/0089760 | A1 * | 4/2006 | Love et al. | 701/4 |
| 2007/0043481 | A1 * | 2/2007 | Metschan et al. | 701/3 |
| 2007/0214033 | A1 * | 9/2007 | Miller | 705/8 |

OTHER PUBLICATIONS

Wang et al.; Modeling time and space metering of flights in the national airspace system; Proc. of the 2004 Winter Simulation Conf.; IEEE.*

Fan et al.; Cluster model for flight demand forecasting; Proc. of the 5th World Congress on Intelligent Control and Automation; Jun. 15-19, 2004; IEEE: p. 3170-3173.*

Oussedik et al.; Dynamic air traffic planning by genetic algorithms; Proc. on the 1999 Congress on Evolutionary Computation; Jul. 6-9, 1999; IEEE, vol. 2, pp. 1110-1117.*

Fellman et al.; Estimating efficacy of progressive planning for air traffic flow management; Proc. of the 2004 Winter Simulation Conf.; IEEE.*

* cited by examiner

*Primary Examiner*—Michael J. Zanelli
(74) *Attorney, Agent, or Firm*—Marsh Fischmann & Breyfogle LLP

(57) ABSTRACT

Systems and methods for airspace demand prediction with improved sector level demand prediction are provided. In one embodiment, an air traffic demand prediction system (10) operable to predict demand within an airspace divided into sectors includes an expanded route predictor (14) operable to generate predicted two-dimensional expanded route information (40) associated with at least one requested flight (34), a trajectory modeler (16) operable to generate predicted four-dimensional expanded route information (46), a sector crossing predictor (18) operable to generate predicted sector crossing information (48), a departure time predictor (22) operable to generate predicted departure time information (54), and a demand modeler (62) operable to generate a demand model (28), the demand model (28) including predicted time intervals associated with the at least one requested flight indicating when it is expected to be present within one or more sectors of the airspace.

30 Claims, 7 Drawing Sheets

AIR TRAFFIC DEMAND PREDICTION

FIELD OF THE INVENTION

The present invention relates generally to air traffic control, and more particularly to predicting airspace demands.

BACKGROUND OF THE INVENTION

The aviation community faces increasing flight delays, security concerns and airline costs. Industry stakeholders such as the Federal Aviation Administration (FAA), the airlines, and the Transportation Security Agency operate in a complex real-time environment with layered dependencies that make the outcome of air traffic management initiatives hard to predict. Thus, planning of air traffic initiatives in more detail, and further in advance, such that the national airspace system can be managed more efficiently has become increasingly important. One key requirement for enacting an air traffic system with higher emphasis on strategic management of traffic is accurately predicting air traffic demand within various airspaces.

Controlled airspaces are typically subdivided into a number of sectors, and generally an individual air traffic controller is responsible for controlling air traffic within a particular sector. The number of flights expected to be in a particular sector during a time period of interest is the demand for that sector. Since one air traffic controller can reasonably be expected to monitor and direct only a limited number of flights (e.g., 10 to 15 flights) at the same time within the sector for which they are responsible, it is desirable to determine the expected demand within sectors of a controlled airspace and the effect that an individual flight request will have on the expected demand at some time in the future so that the flights within an airspace can be directed appropriately to help keep the anticipated number of flights within the sectors of the airspace within manageable levels. A limited number of systems and methods are currently applied to the problem of air traffic demand predictions. One example of such a system is the FAA's enhanced air traffic management system (ETMS). However, many of these methods and systems are not sufficiently accurate, particularly under non-standard environments, such as convective weather situations, in order to effectively predict air traffic demand.

SUMMARY OF THE INVENTION

Accordingly the present invention provides systems and methods for airspace demand prediction with improved sector level demand prediction enabling air traffic controllers to achieve smoother and more expeditious flow of air traffic. In this regard, improved sector level air traffic demand predictions are achieved through the use of advantageous techniques such as flight path clustering, case based route selection, and prediction of departure and sector crossing times using temporal reasoning techniques. Through use of such advanced techniques, an increase in accuracy over existing systems performing similar air traffic demand prediction functions is obtained. For example, by employing geometric clustering techniques to a larger set of historical data, air traffic demand predictions made in accordance with the present invention can be more accurate, and by employing temporal prediction techniques, such as temporal reasoning, a probabilistic approach to air traffic demand prediction is utilized.

In one aspect of the invention, an air traffic demand prediction system includes an expanded route predictor, a trajectory modeler, a sector crossing predictor, a departure time predictor, and a demand modeler. The air traffic demand prediction system operates to predict demand within an airspace divided into sectors.

The expanded route predictor operates to generate predicted two-dimensional expanded route information associated with one or more requested flights. Each requested flight has an associated departure location and an associated destination location. The destination and departure locations are typically airports, although they may be airstrips, landing pads, or other fixed or movable locations from which airplanes, helicopters, airships and other flying vehicles may take off and land. The predicted two-dimensional expanded route information may include geographic position fixes defining a route expected to be flown by each requested flight between its associated departure location and its destination location.

In order to generate the expanded route information, the expanded route predictor may receive historical data including information relating to previously completed instances of one or more flights corresponding with the requested flight(s), geometric cluster data derived from information relating to previously completed flights between the same departure location(s) and destination location(s) as those associated with the requested flight(s), and flight information parameters associated with the requested flight(s). In this regard, the air traffic demand prediction system may include a schedule retriever that operates to retrieve a flight schedule including the flight information parameters relating to the requested flight(s).

The trajectory modeler receives the predicted two-dimensional expanded route information and operates to generate predicted four-dimensional expanded route information associated with the requested flight(s). In this regard, the predicted four-dimensional expanded route information may include geographic position fixes defining a route expected to be flown by the each requested flight between its departure location and its destination location, altitudes associated with the geographic position fixes, and times associated with the geographic position fixes. In addition to receiving the predicted two-dimensional expanded route information, the trajectory modeler may also receive anticipated cruise speed and cruise altitude information associated with the requested flight(s).

The sector crossing predictor receives the predicted four-dimensional expanded route information and operates to generate predicted sector crossing information associated with the requested flight(s). The predicted sector crossing information includes times when the requested flight(s) is/are expected to cross from one sector of the airspace into another sector of the airspace.

The air traffic demand prediction system may also include a response filter. The response filter receives the predicted sector crossing information from the sector crossing predictor and operates to filter the predicted sector crossing information to obtain filtered predicted sector crossing information. The filtered predicted sector crossing information may be used by the demand modeler with predicted departure time information to derive predicted time intervals.

The departure time predictor operates to generate predicted departure time information associated with the requested flight(s). In this regard, the departure time predictor may receive historical departure delay information from which the predicted departure time information may be derived. The historical departure delay information may include information relating to previously completed instances of one or more flights corresponding with the requested flight(s).

The demand modeler operates to generate a demand model. In this regard, the demand model includes predicted time intervals associated with the requested flight(s) indicating when the requested flight(s) is/are expected to be present within one or more sectors of the airspace. The demand modeler derives the predicted time intervals from at least the predicted sector crossing information (or from the filtered predicted sector crossing information when a response filter is included in the air traffic demand prediction system) and the predicted departure time information.

To facilitate use of the information included in the demand model, the air traffic demand prediction system may further include a demand model interface. The demand model interface operates to present the demand model to a user (e.g., an air traffic controller) of the air traffic demand system for utilization thereby and interaction therewith. In this regard, the demand model interface may comprise a graphical user interface displayable on a display device.

In one embodiment, the demand modeler comprises a graph generator. The graph generator receives the predicted sector crossing information and the predicted departure time information and operates to generate a temporal constraint graph corresponding with each sector of the airspace entered or exited by each requested flight along an associated route expected to be flown by each requested flight between its departure location and its destination location. Each temporal constraint graph is derived from the predicted sector crossing information and the predicted departure time information and represents predicted time intervals associated with each requested flight indicating when each requested flight is expected to be within the sector of the airspace corresponding with the graph.

The air traffic demand prediction system may include an enroute traffic retriever. The enroute traffic retriever receives enroute data associated with the requested flight(s) and operates to provide updated enroute information associated with the requested flight(s) using the enroute data. The updated enroute information is input to the trajectory modeler to obtain four-dimensional expanded route information corresponding to the associated enroute data.

In another aspect of the invention, a method of predicting air traffic demand within an airspace divided into sectors includes performing an expanded route prediction for one or more requested flights within the airspace, performing a temporal congestion prediction for the requested flight(s) using results of the expanded route prediction, performing a departure prediction for the requested flight(s), and generating a demand model based on results of the temporal congestion prediction and the departure prediction. Each requested flight has an associated departure location and an associated destination location, and the destination and departure locations may, for example, be airports, airstrips, landing pads, or other fixed or movable locations from which airplanes, helicopters, airships, and other flying vehicles may take off and land. The demand model that is generated includes predicted time intervals associated with each requested flight indicating when each requested flight is expected to be present within one or more sectors of the airspace entered or exited on its route from its associated departure location to its associated destination location.

The step of performing an expanded route prediction may include retrieving flight information parameters associated with the requested flight(s), retrieving historical data including information relating to previously completed instances of one or more flights corresponding with the requested flight(s), retrieving geometric cluster data derived from information relating to previously completed flights between the same departure location and destination location as those associated with the requested flight(s), and generating predicted two-dimensional expanded route information including geographic position fixes defining a route expected to be flown by each requested flight. In this regard, the method may further include the step of utilizing a flight schedule including the flight information parameters relating to the requested flight (s).

The step of performing a temporal congestion prediction may include receiving the predicted two-dimensional expanded route information, generating predicted four-dimensional expanded route information, and generating predicted sector crossing information including times when the requested flight(s) is/are expected to cross from one sector of the airspace into another sector of the airspace. The four-dimensional expanded route information may include geographic position fixes defining a route expected to be flown by each requested flight between its departure location and its destination location, altitudes associated with the geographic position fixes, and times associated with the geographic position fixes. The step of performing a temporal congestion prediction may further include receiving updated enroute information associated with the requested flight(s) and using the updated enroute information to obtain four-dimensional expanded route information associated with the enroute information. The step of performing a temporal congestion prediction may also further include receiving anticipated cruise speed and cruise altitude information associated with the requested flight(s) that is used together with the other received information in generating the predicted four-dimensional expanded route information and generating the predicted sector crossing information.

The step of performing a departure time prediction may include retrieving flight information parameters associated with the requested flight(s), querying historical departure delay information to identify previously completed instances of one or more flights having flight information parameters similar to the flight information parameters of the requested flight(s), and generating a delay distribution for each requested flight based on the identified previously completed instances of one or more flights.

The step of generating a demand model may include generating a temporal constraint graph corresponding with each sector of the airspace entered or exited by each requested flight along an associated route expected to be flown by each requested flight between its departure location and its destination location. In this regard, each temporal constraint graph is derived from the predicted sector crossing information and the predicted departure time information and represents predicted time intervals associated with each requested flight indicating when each requested flight is expected to be within the sector of the airspace corresponding with the graph.

The method of predicting air traffic demand may also include filtering the results of the temporal congestion prediction prior to the step of generating a demand model. In this regard, in the step of generating a demand model, the predicted time intervals may be derived from the results of the departure prediction and the filtered results of the temporal congestion prediction.

The method of predicting air traffic demand may further include outputting the demand model to one or more individuals responsible for directing air traffic within the airspace. In this regard, the step of outputting may include displaying parameters of the demand model in a graphical user interface on a display device.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1:
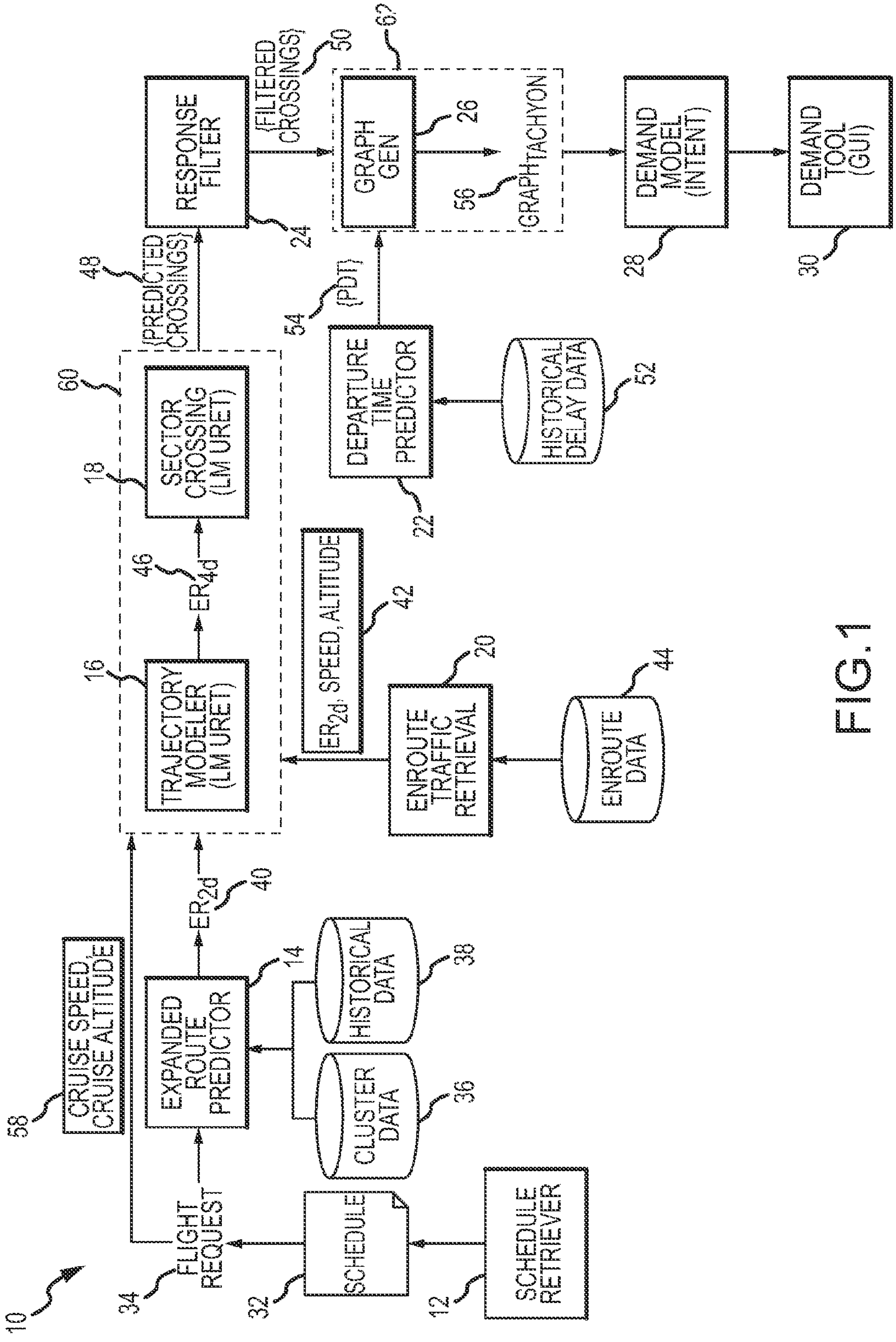
FIG. 1 is a block diagram of one embodiment of an air traffic demand prediction system.

FIG. 1 shows one embodiment of an air traffic demand prediction system 10. The air traffic demand prediction system 10 analyzes one or more requested flights to determine the effect of the requested flight(s) on the demand within various sectors of a controlled airspace during a time period of interest.

The air traffic demand prediction system 10 includes a schedule retrieval component 12, an expanded route prediction component 14, a trajectory modeling component 16, a sector crossing component 18, an enroute traffic retrieval component 20, a departure time prediction component 22, a response filter component 24, and a graph generation component 26. Such components 12-26 may also be referred to herein as the schedule retriever 12, the expanded route predictor, the trajectory modeler, the sector crossing predictor 18, the enroute traffic retriever 20, the departure time predictor 22, the response filter 24, and the graph generator 26. In the present embodiment, the various components 12-26 of the air traffic demand prediction system 10 are implemented in software instructions executable by one or more processors. In other embodiments, one or more of the components 12-26 of the air traffic demand prediction system may be implemented in hardware or in programmable logic (e.g., in a field programmable gate array) instead of software.

Using various inputs, the components 12-26 of the air traffic demand prediction system 10 generate a demand model 28. The demand model 28 is provided to a demand model interface 30 for presentation to and utilization by a user of the air traffic demand system 10. In this regard, the demand model interface 30 may be a graphical user interface (GUI) displayable on a display device such as, for example, a computer monitor. In this regard, the demand model interface 30 may be implemented in software instructions executable by one or more processors. In other embodiments, the demand model interface 30 may be a non-graphical interface and it may be implemented in hardware or in programmable logic (e.g., in a field programmable gate array) instead of software.

The schedule retrieval component 12 operates to retrieve a flight schedule 32. The schedule retrieval component 12 may retrieve the flight schedule 32 by combining various sources of information including published flight schedules (e.g., the official airline guide (OAG)) available from various airlines and air charter services. The flight schedule 32 includes flight information relating to one or more flights scheduled to depart during a time period of interest. In this regard, the flight information in the flight schedule 32 may include, for example, airline, aircraft type, scheduled departure time, departure airport and destination airport for each flight in the schedule 32. The time period of interest may, in general, be a block of time of any desired length starting at any time in the future. However, in one embodiment, the time period of interest is a one-hour period commencing fifteen hours in the future. The duration of the time period of interest and/or when such time period commences may be fixed in the air traffic management system 10 or variable based on, for example, user selected preferences during start-up of the air traffic demand prediction system 10 and/or user input during operation of the system 10.

Once the flight schedule 32 is created for a time period of interest, a flight request 34 may be selected from the flight schedule 32 for subsequent processing by the air traffic demand prediction system 10. The flight request 34 may also be referred to herein as the requested flight 34. The flight information from the flight schedule 32 for the requested flight 34 is input to the expanded route prediction component 14. Additionally, further information 58 relating to the requested flight 32 may be input to the trajectory modeling component 16. Of particular significance to the trajectory modeling component 16 is the cruise speed and cruise altitude of the flight request 32. Such additional information (e.g., cruise speed, cruise altitude) 58 may be associated with flights included in the schedule 32 by the schedule retrieval component 12 from historical data and/or predictive algorithms.

The expanded route prediction component 14 receives as inputs the flight information for the flight request 34 and also geometric cluster data 36 relating to air traffic routes and historical data 38 relating to air traffic routes. The historical data 38 includes information describing individual flight paths taken by completed flights from departure airports to destination airports. Such information may comprise geographic position fixes specified by, for example, latitude and longitude (lat/long points) associated with the various segments of an individual flight path. The geometric cluster data 36 includes averages or other combinations of the information describing similar individual flight paths taken by completed flights from departure airports to destination airports. In this regard, the geometric cluster data 36 may be obtained from the historical data 38 as described in connection with FIG. 3.

All of the historical data 38 and the geometric cluster data 36 available may not necessarily be relevant to the particular flight request 34 being processed since the historical data 38 and the geometric cluster data 36 available may relate to completed flights between different departure and/or destination airports than those in the flight information associated with the flight request 34. In this regard, only historical data 38 and geometric cluster data 36 associated with flights between the same departure and destination airports as in the flight information associated with the flight request 34 being processed may be selected from the historical data 38 and the geometric cluster data 36 for input to the expanded route prediction component 14. For example, if the requested flight 34 originates in San Francisco and is destined for Chicago O'Hare, then historical data 38 and geometric cluster data 36 relating to completed flights from San Francisco to Chicago O'Hare may be selected as the relevant data for input to the expanded route prediction component 14.

Using flight information for the flight request 34, relevant cluster data 36 and relevant historical data 38 as inputs, the expanded route prediction component 14 operates to generate predicted two-dimensional expanded route information (predicted $ER_{2d}$) 40 associated with the flight request 34. In this regard, the predicted $ER_{2d}$ 40 associated with the flight request 34 includes predicted geographic position fixes (e.g., lat/long points) that define a route expected to be flown by the requested flight 34 from its departure airport to its destination airport. Such predicted route will involve one or more, and often many, air traffic control sectors within the airspace from the departure airport to the destination airport.

The enroute traffic retrieval component 20 operates to generate a set of zero or more enroute flights associated with the flight request 34 for input to the trajectory modeling component 16. An enroute flight consists of two-dimensional expanded route information along with cruise speed and cruise altitude (collectively enroute information 42). In this regard, the enroute information 42 may be obtained from a database of enroute data 44. The enroute data 44 may, for example, include information from a flight plan filed for the requested flight 34 prior to departure and/or actual information transmitted from the flight and/or obtained by systems monitoring the airspace traversed by the flight.

The trajectory modeling component 16 receives the predicted $ER_{2d}$ 40 from the expanded route prediction component 14 along with the additional flight information 58 (e.g., predicted cruise speed and cruise altitude) associated with the requested flight 34. Using these inputs, the trajectory modeling component 16 operates to generate predicted four-dimensional expanded route information (predicted $ER_{4d}$) 46. In this regard, the predicted $ER_{4d}$ 46 includes geographic position fixes (e.g., latitude/longitude points) that define a route expected to be flown by the requested flight 34 from its departure airport to its destination airport along with altitude and times associated with such geographic position fixes. Also, when available, the enroute information 42 from the enroute traffic retrieval component 20 is input to the trajectory modeling component 16 to provide an enhanced picture of airspace demand in addition to the airspace demands imposed by the requested flight 34 being processed.

The sector crossing component 18 receives the predicted $ER_{4d}$ 46 from the trajectory modeling component 16. Using the predicted $ER_{4d}$ 46 as an input, the sector crossing component 18 outputs predicted sector crossing information 48 to the response filter component 24. In this regard, the predicted sector crossing information 48 includes predicted four-dimensional entry and exit points (e.g., latitude, ongitude, altitude, and time) for the airspace sectors along the predicted route of the requested flight 34.

As shown, the trajectory modeling component 16 and the sector crossing component 18 may be part of another air traffic control related system 60. One example of a suitable system 60 is the Lockheed Martin User Request Evaluation Tool (LM URET) system 60. Such a system 60 has been installed in Air Route Traffic Control Centers (ARTCCs) and includes trajectory modeling and sector crossing components 16, 18 suitable for interfacing with or incorporating into the air traffic demand prediction system 10. In other embodiments, the trajectory modeling component 16 and/or the sector crossing component 18 may be components that are only included within the air traffic demand prediction system 10.

The response filter component 24 receives the predicted sector crossing information 48 from the sector crossing component 18. The response filter component 24 operates to filter the predicted sector crossing information 48 to obtain filtered predicted sector crossing information 50. In this regard, the filtered predicted sector crossing component filters the predicted sector crossing information 48 to format times and durations into a standard format and to remove duplicate or otherwise unnecessary sector crossing information.

Using historical departure delay time data 52 as an input, the departure time prediction component 22 generates predicted departure time information 54 for the requested flight 34. In this regard, the predicted departure time information 54 may include a temporal interval during which the requested flight is predicted to depart. A departure time prediction process that may be utilized by the departure time prediction component 22 to generate the predicted departure time information 54 is described in connection with FIG. 4.

The filtered predicted sector crossing information 50 and the predicted departure time information 54 are input to the graph generation component 26. Using these inputs, the graph generation component 26 generates a temporal constraint graph 56 representing predicted time intervals for various segments of the requested flight 34 (e.g., predicted early, middle and late entry times into and exit times from various sectors to be traversed by the requested flight 34) along its predicted route.

In one embodiment, the temporal constraint graph 56 generated for each segment of the predicted route may be a Tachyon graph. Tachyon is a computer software implementation of a constraint-based model for representing and reasoning about qualitative and quantitative aspects of time. The Tachyon software may also be referred to herein as the Tachyon temporal reasoner. The Tachyon temporal reasoner was developed by General Electric Global Research Center (GE GRC). In other embodiments, software and/or hardware providing sufficiently similar functionality may be employed in place of the Tachyon temporal reasoner. An exemplary Tachyon graph 56 is depicted and described in connection with FIG. 5B.

The graph generation component 26 and the Tachyon graph(s) 56 generated thereby may comprise a demand model generation component 62. In other embodiments, the demand model generation component 62 may include additional elements. The output from the demand model generation component 62 (e.g., graph(s) 56) is used to update the demand model 28 that is provided to the demand model interface 30 for presentation to and interaction therewith by a user of the air traffic demand system 10. In this regard, the demand model 28 represents how many flights will be in various sectors of the airspace during the time period of interest. The demand model 28 is updated to incorporate information about the sectors expected to be traversed by the requested flight 34 and predicted time intervals that the requested flight 34 is expected to be in such sectors along with similar information for all other requested flights analyzed for the time period of interest. In this regard, one or more additional requested flights (e.g., obtained from the flight schedule 32) may be analyzed by the air traffic demand prediction system 10 to generate the demand model 28 for all of the requested flights during the time period of interest.

Figure 2:
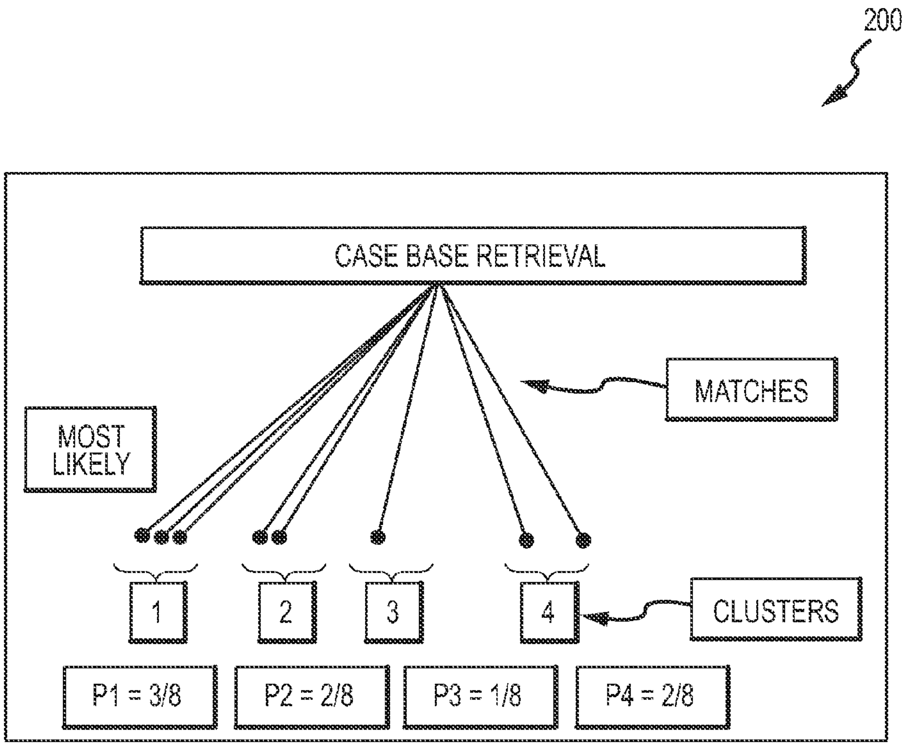
FIG. 2 is a diagrammatic view of one embodiment of a case-based retrieval process.

FIG. 2 illustrates one embodiment of a case-based retrieval process 200 that may be undertaken by the air traffic demand prediction system 10 of FIG. 1, and the expanded route prediction component 14 thereof in particular in order to generate the predicted $ER_{2d}$ 40 associated with the flight request 34. The case based retrieval process involves querying the historical data 38 for matches using flight information parameters including the following: (1) departure airport; (2) destination airport; (3) airline; (4) aircraft type; (5) flight number; (6) time of day; (7) day of week; and (8) month of year. If no matches are found using all of the foregoing parameters, then one or more subsequent queries are performed until matches are found. Each subsequent query performed uses progressively fewer parameters (e.g., the first subsequent query uses parameters (1)-(7), the next subsequent query uses parameters (1)-(6), etc.).

The matches returned by the query or queries are organized into clusters based on proximity of geographic position fixes associated with each flight represented in the historical data 38. The clusters are created apriori and the matches returned by the query or queries are sorted according to the historical flight clusters created apriori. For example, as illustrated in FIG. 2, there may be a total of eight matches returned that are organized into a total of four clusters. The first cluster may include three of the eight matches, the second cluster may include two of the eight matches, the third cluster may include one of the eight matches, and the fourth cluster may include two of the eight matches. Thus, the probabilities associated with the first through fourth clusters are, respectively, 3/8, 2/8, 1/8, and 2/8. The most represented cluster (e.g., the first cluster in the example of FIG. 2) is chosen as the representative cluster and the match with the highest score (e.g., most matched parameters) is chosen as the seed flight for the subsequent prediction undertaken by the air traffic demand prediction system 10.

Figure 3:
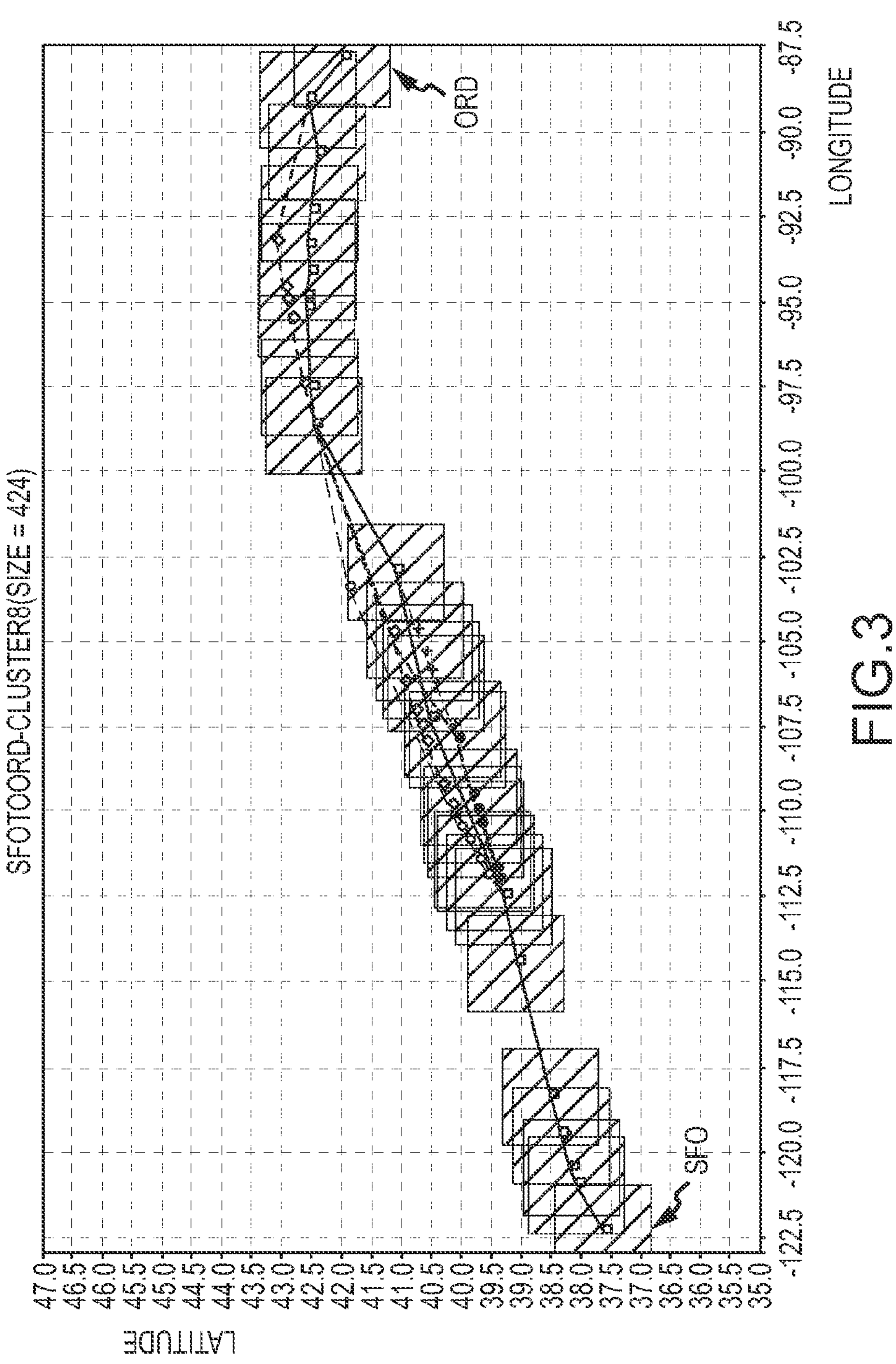
FIG. 3 is a plot depicting clustering of exemplary completed flight routes from San Francisco to Chicago O'Hare.

A cluster selected in accordance with the case-based retrieval process undertaken by the air traffic demand prediction system 10 may be visualized by plotting rectangular boundaries (bounding boxes) around geographical position fixes (lat/long points) of the seed flight. In this regard, FIG. 3 is a plot depicting clustering of exemplary San Francisco (SFO) to Chicago O'Hare (ORD) routes that includes four-hundred twenty-four similar flights. In the example of FIG. 3, bounding boxes that are approximately 1.5 degrees of latitude by 2.5 degrees of longitude have been employed, but larger or smaller bounding boxes may be employed. The geographic position fixes (e.g., lat/long points) for the flight segments located within the bounding boxes surrounding the seed flight position fixes may be averaged (or otherwise combined in some manner) to obtain the relevant geometric cluster data.

Figure 4:
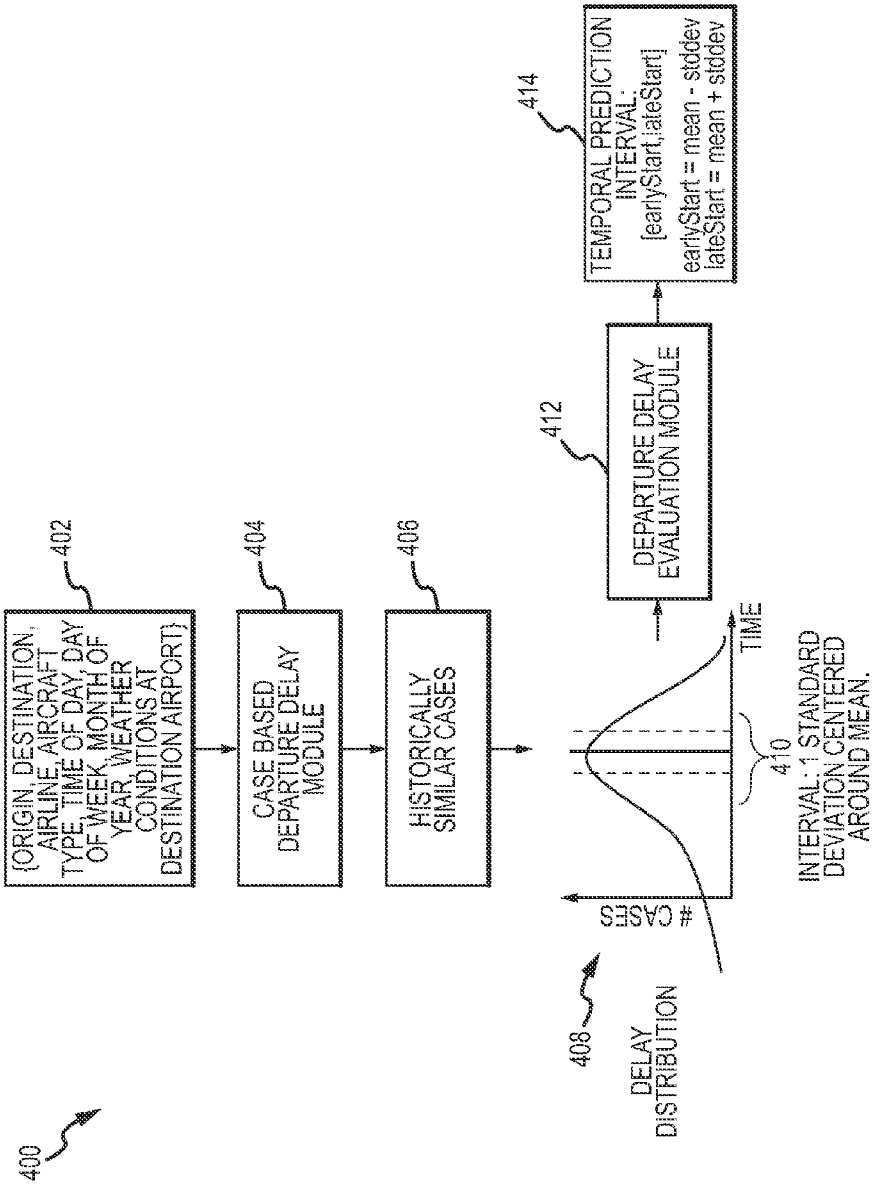
FIG. 4 is a diagrammatic view of one embodiment of a departure delay prediction process.

FIG. 4 illustrates one embodiment of a departure delay prediction process 400 that may be undertaken by the air traffic demand prediction system 10 of FIG. 1, and the departure time prediction component 22 thereof to generate the predicted departure time information 54 for the requested flight 34. The departure delay prediction process 400 includes receiving 402 a number of flight request information parameters including the following: (1) departure airport; (2) destination airport; (3) airline; (4) aircraft type; (5) flight number; (6) time of day; (7) day of week; (8) month of year; and (9) weather conditions at the destination airport. The flight request information parameters are input to a case based departure delay module 404. The case based departure delay module 404 compares the flight request information parameters input thereto in relation to historical data (e.g., the historical delay data 52) to identify historically similar cases 406.

The historically similar cases are used to generate a delay distribution 408. As shown, the delay distribution 408 may be represented by a curve showing the number of historically similar cases versus the temporal delay. A predicted delay interval 410 may then be established. In this regard, the delay interval 410 may be established using, for example, one standard deviation from the mean of the distribution.

The delay distribution 408 and predicted delay interval 410 are input to a departure delay evaluation module 412. The departure delay evaluation module 412 outputs a temporal prediction interval 414. The temporal prediction interval 414 comprises a predicted early departure time (earlyStart or ES) and a predicted late departure time (lateStart or LS) for the requested flight 34. In this regard, ES may be obtained by subtracting one standard deviation from the mean departure time of the delay distribution and LS may be obtained by adding one standard deviation to the mean departure time of the delay distribution.

Figure 5A:
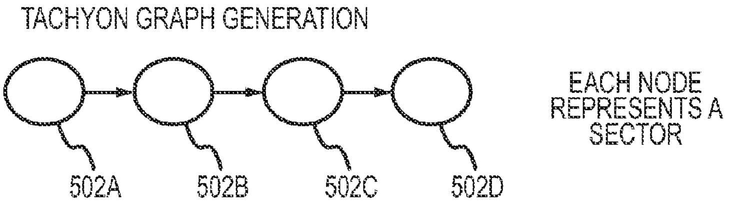
FIG. 5A is a diagrammatic view of one embodiment of a graph generation process.

FIG. 5A depicts one embodiment of a graph generation process 500 that may be undertaken by the air traffic demand prediction system 10 of FIG. 1, and the graph generation component 26 thereof. The graph generation process 500 involves propagating relevant constraints for a plurality of nodes 502A-502D wherein each node 502A-502D represents a sector within the airspace to be traversed by the requested flight 34. In this regard, the aforementioned Tachyon software may be utilized to implement the graph generation process 500 and subsequent solution thereof using applicable constraints.

In the embodiment of FIG. 5A, there are four nodes 502A-502D, but there may be more or fewer nodes than depicted. The four nodes include an initial node 502A, two intermediate nodes 502B, 502C, and a final node 502D. The initial node 502A represents the first sector that the requested flight 34 will be in upon entering controlled airspace (e.g., taking off from the departure airport), the final node 502D represents the last sector that the requested flight 34 will be in upon exiting controlled airspace (e.g., landing at the destination airport), and the intermediate nodes 502B, 502C represent intermediary sectors entered and exited along the expected route of the requested flight 34.

Figure 5B:
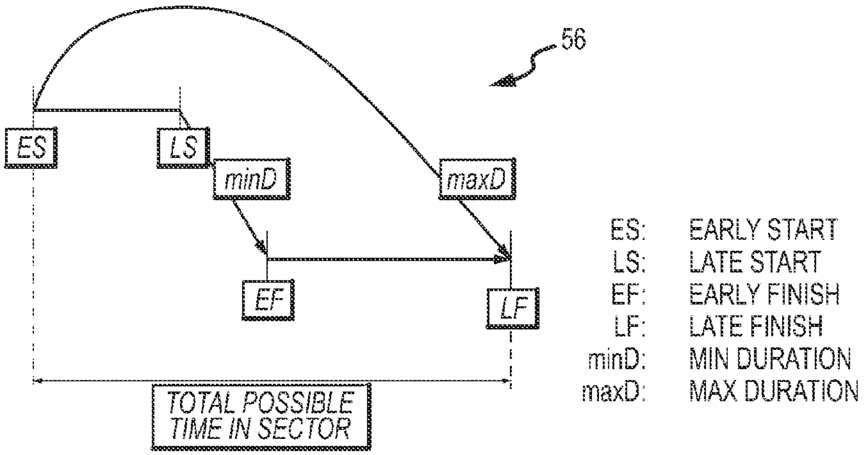
FIG. 5B is plot showing an exemplary temporal constraint graph.

A representation of initial node 502A temporal constraints associated with requested flight 34 is shown in the graph 56 of FIG. 5B. A number of constraints associated with the requested flight 34 are depicted in the plot of FIG. 5B, namely an early start time (ES), a late start time (LS), a minimum elapsed time (minD) though the sector, and a maximum elapsed time (maxD) through the sector. The estimated early start (ES) and late start (LS) time may be obtained in accordance with the departure delay prediction process 400 as described in connection with FIG. 4. The minD and maxD constraints may be derived from the predicted sector crossing information 48 output by the sector crossing component 18 for the first sector. In addition, an early finish time (EF) and a latest finish time (LF) depend upon the foregoing constraints (ES, LS, minD and maxD). As depicted, a total possible time in sector comprises the difference between LF and ES. Relevant constraints for the intermediate nodes 502B, 502C and the final node 502D include minD and maxD for such represented sectors, which may be derived from the sector crossing information 48 output by the sector crossing component 18 for such sectors.

Figure 6:
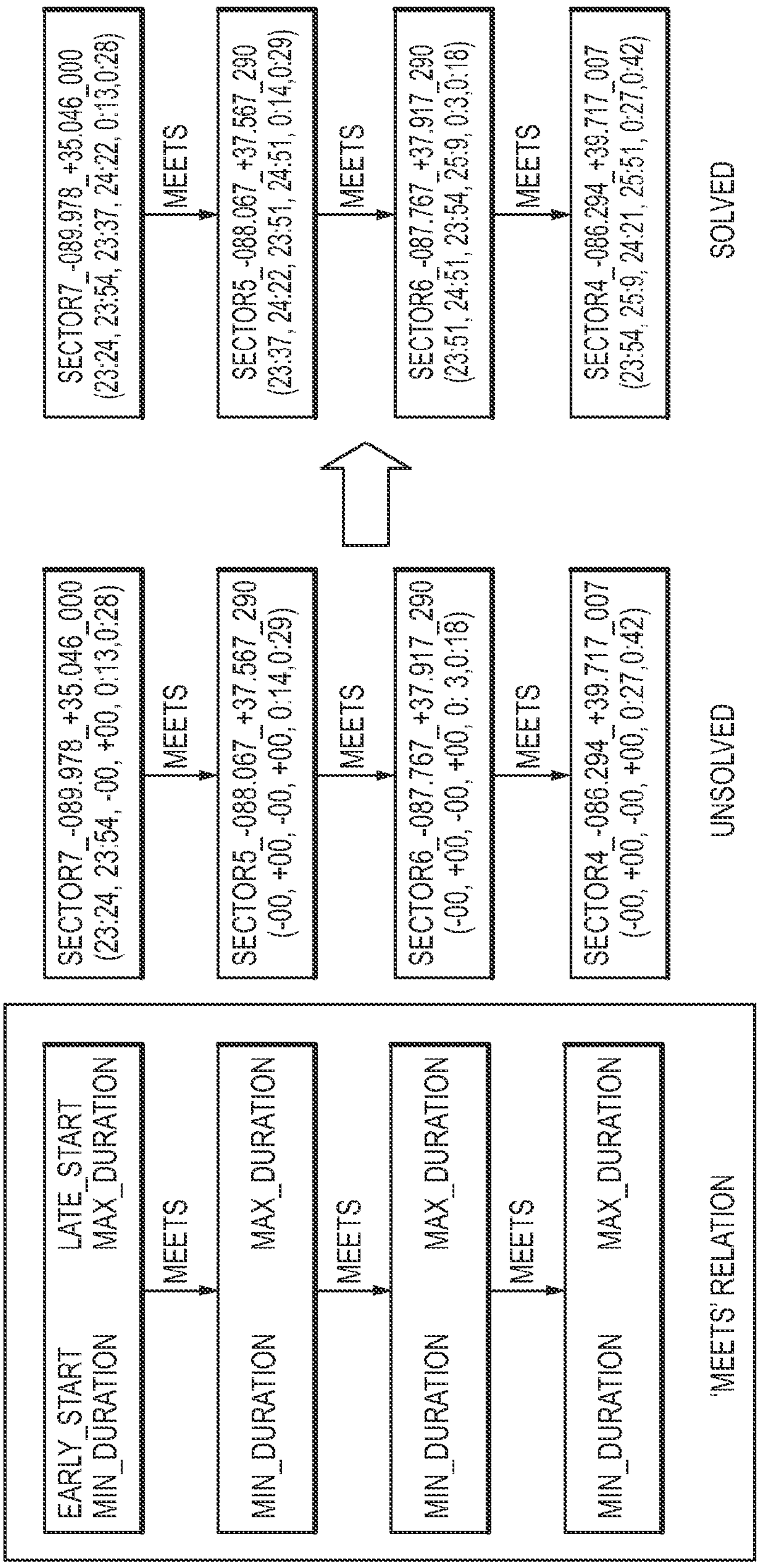
FIG. 6 depicts an exemplary solution obtained by the graph generation process.

The Tachyon temporal reasoner is used to propagate the relevant constraints for each node 502A-502D to obtain the graph 56 associated with each node 502A-502D. In this regard, FIG. 6 depicts a solution obtained by the Tachyon temporal reasoner for the four exemplary sectors represented by the four nodes 502A-502D of FIG. 5A. The solution (shown in the rightmost column of FIG. 6) represents predicted time intervals during which the requested flight 34 is expected to be within each of the sectors represented by the nodes 502A-502D. The predicted time intervals indicate when the requested flight 34 is expected to be within each sector and such predicted time intervals are included in the demand model 28.

Figure 7:
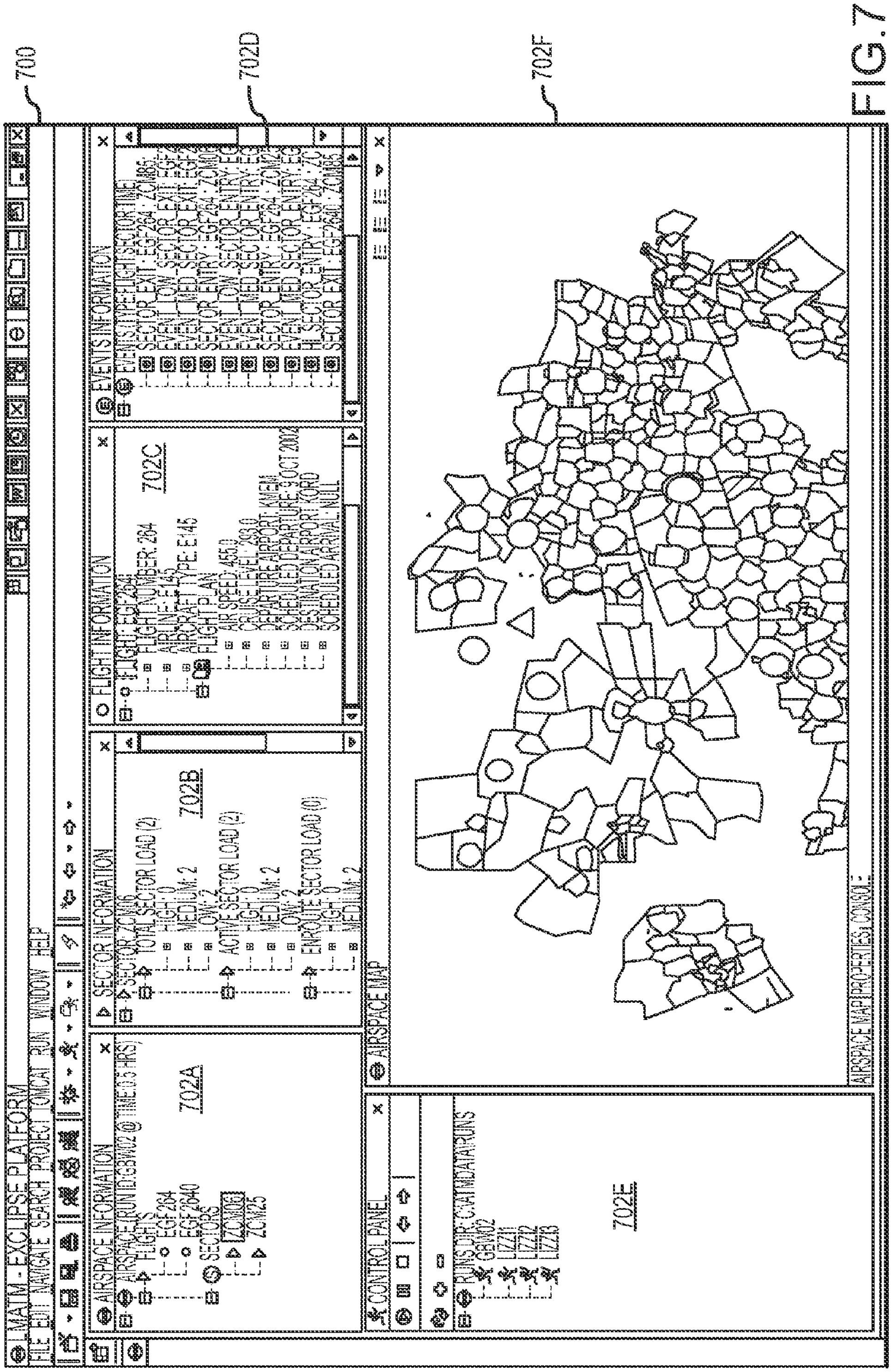
FIG. 7 depicts one embodiment of a graphical user interface of a demand model interface of the air traffic demand prediction system.

FIG. 7 depicts one embodiment of a graphical user interface (GUI) 700 of the demand model interface 30 of the air traffic demand prediction system 10. The GUI includes a number of different panes or windows 702A-702F. The panes include an airspace information pane 702A, a sector information pane 702B, a flight information pane 702C, an events information pane 702D, a control panel pane 702E, and an airspace map pane 702F. The panes 702A-702F may be arranged in a number of different manners including in a tiled fashion as depicted.

The airspace information pane 702A displays information identifying one or more sectors within an airspace and one or more requested flights within the airspace that have been processed by the air traffic demand prediction system 10 to include such flights in the demand model 28. In the example of the FIG. 7, two simulated requested flights ("EGF264" and "EGF2640") and two sectors ("ZCM06" and "ZCM25") are listed. During operation of the air traffic demand prediction system 10 there may be fewer or more requested flights and fewer or more sectors within the airspace than are listed in the airspace information pane 702A of the GUI 700 of FIG. 7.

The sector information pane 702B displays information relating to a selected sector (e.g., selected by clicking on its name in the airspace information pane 702A or on its location in the airspace map pane 702F). Information displayed in the sector information pane 702B may include, for example, total sector load, average sector load and enroute sector load information. In the example of FIG. 7, information relating to sector "ZCMO6" is displayed. The selection of a particular sector for display in the sector information pane 702B may be indicated by highlighting the selected sector in the airspace information pane 702A, such as is illustrated for sector "ZCM06".

The flight information pane 702C displays information relating to a requested flight processed by the air traffic demand prediction system 10. Information displayed in the flight information pane 702C may include, for example, flight number, airline, aircraft type and flight plan (e.g., air speed, cruise level, departure airport, scheduled departure date/time, destination airport, and scheduled arrival date/time) information. In the example of FIG. 7, information relating to flight "EGF264" is displayed since it was the requested flight most recently processed.

The events information pane 702D displays information relating to one or more events that may take place for a requested flight (e.g., the requested flight for which information is displayed in the flight information pane 702C). In this regard, the information displayed for each event may include a number of parameters such as, for example, an event type, the flight identifier (e.g., "EGF264"), a sector (e.g., "ZCM25") in which the event occurs, and the time of the event. Examples of event types include predicted low (earliest), medium, and high (latest) times of entry of the flight into a sector and exit of the flight from a sector.

The control panel pane 702E displays information identifying one or more available air traffic demand predictions (or runs) associated with one or more airspaces. In the example of FIG. 7, runs identified as "GBW02", "LIZZI1", "LIZZI2", and "LIZZI3" are available. A particular run may be selected for execution by the air traffic demand prediction system 10 by clicking on its identifier in the control panel pane 702E. In the example of FIG. 7, the selection of the "GBW02" run for execution has been indicated by highlighting its identifier.

The airspace map pane 702F displays a two-dimensional airspace map depicting the boundaries of the various sectors within the airspace associated with the run selected for execution in the control panel pane 702E. The sector selected for display in the sector information pane 702B may be highlighted on the map displayed within the airspace map pane 702F. In the example of FIG. 7, sector "ZCM06" is highlighted. Additionally, although not shown in FIG. 7, the various sectors may be color coded to indicate the predicted sector loads (e.g., total, active, or enroute) associated therewith. For example, sectors having predicted loads below a lower acceptable level (e.g., 10 flights) may be color-coded a first color (e.g., green), sectors having predicted loads between the lower acceptable level and a higher acceptable level (e.g., 15 flights) may be color coded a second color (e.g., yellow), and sectors having predicted loads exceeding the higher acceptable level may be color coded a third color (e.g., red). Such color coding permits a user of the air traffic demand prediction system 10 to quickly visually identify predicted problem sectors and to select such sectors for display in the sector information pane 702B. In this regard, a particular sector can also be selected for display in the sector information pane 702B by selecting it on the map in the airspace map pane 702F.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. An air traffic demand prediction system operable to predict demand within an airspace divided into sectors, said system comprising:

an expanded route predictor, the expanded route predictor being operable to generate predicted two-dimensional expanded route information associated with at least one requested flight, the at least one requested flight having an associated departure location and an associated destination location;

a trajectory modeler receiving the predicted two-dimensional expanded route information, the trajectory modeler being operable to generate predicted four-dimensional expanded route information associated with the at least one requested flight;

a sector crossing predictor receiving the predicted four-dimensional expanded route information, the sector crossing predictor being operable to generate predicted sector crossing information associated with the at least one requested flight, the sector crossing information including times when the at least one requested flight is expected to cross from one sector of the airspace into another sector of the airspace;

a departure time predictor, the departure time predictor being operable to generate predicted departure time information associated with the at least one requested flight; and a demand modeler operable to generate a demand model, the demand model including predicted time intervals associated with the at least one requested flight indicating when the at least one requested flight is expected to be present within one or more sectors of the airspace, the predicted time intervals being derived from at least the predicted sector crossing information and the predicted departure time information.

2. The system of claim 1 wherein the predicted two-dimensional expanded route information includes geographic position fixes defining a route expected to be flown by the at least one requested flight between its departure location and its destination location.

3. The system of claim 1 wherein the predicted four-dimensional expanded route information includes geographic position fixes defining a route expected to be flown by the at least one requested flight between its departure location and its destination location, altitudes associated with the geographic position fixes, and times associated with the geographic position fixes.

4. The system of claim 1 wherein the expanded route predictor receives historical data including information relating to previously completed instances of one or more flights corresponding with the at least one requested flight, geometric cluster data derived from information relating to previously completed flights between the same departure location and destination location as those associated with the at least one requested flight, and flight information parameters associated with the at least one requested flight.

5. The system of claim 4 further comprising:

a schedule retriever, the schedule retriever being operable to retrieve a flight schedule, wherein the flight schedule includes the flight information parameters relating to the at least one requested flight.

6. The system of claim 1 wherein the trajectory modeler further receives anticipated cruise speed and cruise altitude information associated with the at least one requested flight.

7. The system of claim 1 further comprising:

an enroute traffic retriever operable to retrieve enroute information corresponding to enroute flights associated with the requested flight, the enroute information being input to the trajectory modeler.

8. The system of claim 1 wherein the departure time predictor receives historical departure delay information including information relating to previously completed instances one or more flights corresponding with the at least one requested flight.

9. The system of claim 1 further comprising:

a demand model interface, the demand model interface being operable to present the demand model to a user of the air traffic demand system.

10. The system of claim 9 wherein the demand model interface comprises a graphical user interface displayable on a display device.

11. The system of claim 1 further comprising:

a response filter receiving the predicted sector crossing information from the sector crossing predictor, the response filter being operable to filter the predicted sector crossing information to obtain filtered predicted sector crossing information, the filtered predicted sector crossing information being used by the demand modeler with the predicted departure time information to derive the predicted time intervals.

12. The system of claim 11 wherein the demand modeler includes:

a graph generator receiving the filtered predicted sector crossing information and the predicted departure time information, the graph generator being operable to generate a temporal constraint graph corresponding with each sector of the airspace entered or exited by the at least one requested flight along a route expected to be flown by the at least one requested flight between its departure location and its destination location, each temporal constraint graph being derived from the predicted sector crossing information and the predicted departure time information and representing predicted time intervals associated with the at least one requested flight indicating when the at least one requested flight is expected to be within the sector of the airspace corresponding with the graph.

13. The system of claim 1 wherein said expanded route predictor, said trajectory modeler, said sector crossing generator, said departure time predictor, and said demand modeler comprise instructions executable by one or more processors.

14. A method of predicting air traffic demand within an airspace divided into sectors, said method comprising the steps of:

performing an expanded route prediction for at least one requested flight within the airspace, the at least one requested flight having an associated departure location and an associated destination location;

performing a departure prediction for the at least one requested flight;

performing a temporal congestion prediction for the at least one requested flight using results of the expanded route prediction; and generating a demand model based on results of the temporal congestion prediction and the departure prediction, the demand model including predicted time intervals associated with the at least one requested flight indicating when the at least one requested flight is expected to be present within one or more sectors of the airspace entered or exited on its route from its associated departure location to its associated destination location.

15. The method of claim 14 wherein said step of performing an expanded route prediction comprises:

retrieving flight information parameters associated with the at least one requested flight;

retrieving historical data including information relating to previously completed instances of one or more flights corresponding with the at least one requested flight;

retrieving geometric cluster data derived from information relating to previously completed flights between the same departure location and destination location as those associated with the at least one requested flight; and generating predicted two-dimensional expanded route information including geographic position fixes defining a route expected to be flown by the at least one requested flight.

16. The method of claim 15 further comprising:

utilizing a flight schedule including the flight information parameters relating to at least one requested flight.

17. The method of claim 14 wherein said step of performing a temporal congestion prediction comprises:

receiving predicted two-dimensional expanded route information;

generating predicted four-dimensional expanded route information including geographic position fixes defining a route expected to be flown by the at least one requested flight between its departure location and its destination location, altitudes associated with the geographic position fixes, and times associated with the geographic position fixes; and generating predicted sector crossing information including times when the at least one requested flight is expected to cross from one sector of the airspace into another sector of the airspace.

18. The method of claim 17 wherein said step of performing a temporal congestion prediction further comprises:

receiving enroute information associated with the at least one requested flight; and using the enroute information to obtain four-dimensional expanded route information associated with each enroute flight associated with the at least one requested flight.

19. The method of claim 17 wherein said step of performing a temporal congestion prediction further comprises:

receiving anticipated cruise speed and cruise altitude information associated with the at least one requested flight.

20. The method of claim 14 wherein said step of performing a departure time prediction comprises:

retrieving flight information parameters associated with the at least one requested flight;

querying historical departure delay information to identify previously completed instances of one or more flights having flight information parameters similar to the flight information parameters of the at least one requested flight; and generating a delay distribution for the at least one requested flight based on the identified previously completed instances of one or more flights.

21. The method of claim 14 further comprising:

outputting the demand model to one or more individuals responsible for directing air traffic within the airspace.

22. The method of claim 21 wherein said step of outputting comprises displaying parameters of the demand model in a graphical user interface on a display device.

23. The method of claim 14 wherein said step of generating a demand model comprises:

generating a temporal constraint graph corresponding with each sector of the airspace entered or exited by the at least one requested flight along a route expected to be flown by the at least one requested flight between its departure location and its destination location, each temporal constraint graph being derived from the predicted sector crossing information and the predicted departure time information and representing predicted time intervals associated with the at least one requested flight indicating when the at least one requested flight is expected to be within the sector of the airspace corresponding with the graph.

24. The method of claim 14 further comprising:

filtering the results of the temporal congestion prediction prior to said step of generating a demand model, wherein in said step of generating a demand model the predicted time intervals are derived from the results of the departure prediction and the filtered results of the temporal congestion prediction.

25. A system for predicting air traffic demand within an airspace divided into sectors, said system comprising:

an expanded route predictor that performs an expanded route prediction for at least one requested flight within the airspace, the at least one requested flight having an associated departure location and an associated destination location;

a departure time predictor that performs a departure prediction for the at least one requested flight within the airspace;

a temporal congestion predictor that performs a temporal congestion prediction for the at least one requested flight within the airspace using results of the expanded route prediction; and a demand modeler that generates a demand model based on results of the temporal congestion prediction and the departure prediction, the demand model including predicted time intervals associated with the at least one requested flight indicating when the at least one requested flight is expected to be present within one or more sectors of the airspace.

26. The system of claim 25 wherein said expanded route predictor comprises instructions executable by one or more processors to generate predicted two-dimensional expanded route information associated with the at least one requested flight.

27. The system of claim 25 wherein said expanded route predictor generates predicted two-dimensional expanded route information associated with the at least one requested flight, and wherein said temporal congestion predictor comprises instructions executable by one or more processors to generate predicted four-dimensional expanded route information associated with the at least one requested flight using at least the predicted two-dimensional expanded route information and to generate predicted sector crossing information associated with the at least one requested flight using at least the predicted four-dimensional expanded route information.

28. The system of claim 25 wherein said departure time predictor comprises instructions executable by one or more processors to generate predicted departure time information associated with the at least one requested flight.

29. The system of claim 25 wherein said temporal congestion predictor generates predicted sector crossing information associated with the at least one requested flight, wherein said departure time predictor generates predicted departure time information associated with the at least one requested flight, and wherein said demand modeler comprises instructions executable by one or more processors to generate the demand model from at least the predicted sector crossing information and the predicted departure time information.

30. The system of claim 25 further comprising:

a graphical user interface displayable on a display device, wherein the graphical user interface presents the demand model to a user of the system.

* * * * *

UNITED STATES PATENT AND TRADEMARK OFFICE

CERTIFICATE OF CORRECTION

PATENT NO. : 7,664,596 B2
APPLICATION NO. : 11/427728
DATED : February 16, 2010
INVENTOR(S) : Wise et al.

It is certified that error appears in the above-identified patent and that said Letters Patent is hereby corrected as shown below:

Column 7, line 55, delete "ongitude" and insert therefor --longitude--.

Signed and Sealed this

Seventeenth Day of August, 2010

David J. Kappos
*Director of the United States Patent and Trademark Office*

UNITED STATES PATENT AND TRADEMARK OFFICE

CERTIFICATE OF CORRECTION

PATENT NO. : 7,664,596 B2
APPLICATION NO. : 11/427728
DATED : February 16, 2010
INVENTOR(S) : Wise et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 849 days.

Signed and Sealed this

Twenty-eighth Day of December, 2010

David J. Kappos

*Director of the United States Patent and Trademark Office*